June 30, 1925. 1,544,375
W. H. COOK
EXPANSIBLE RIM
Filed Sept. 30, 1921  2 Sheets-Sheet 1

Inventor
W. H. Cook
By
Lester L. Sargent
Attorney

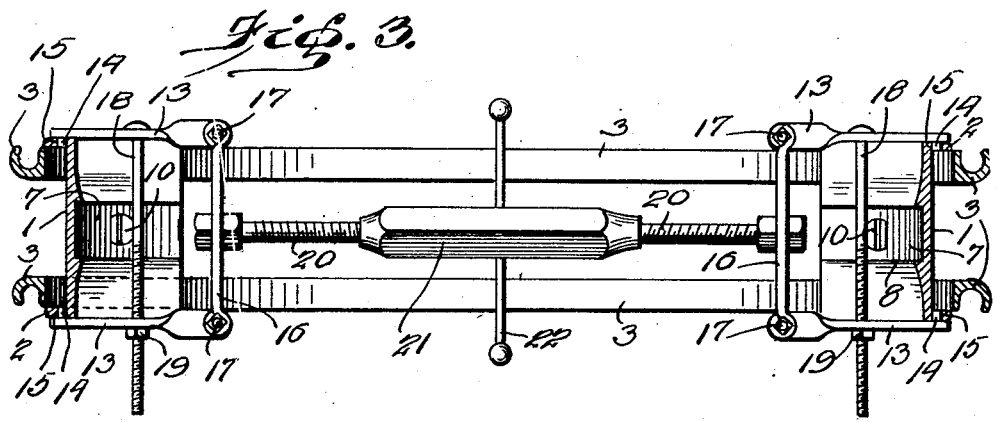
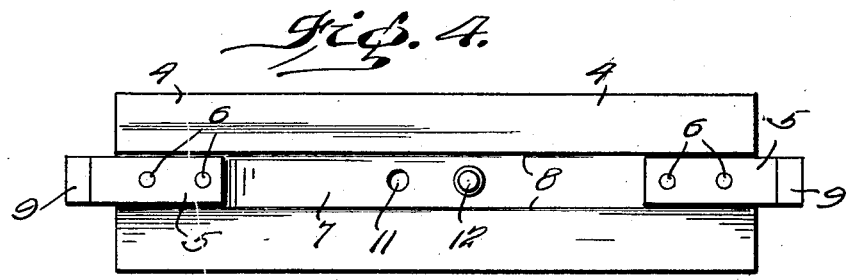
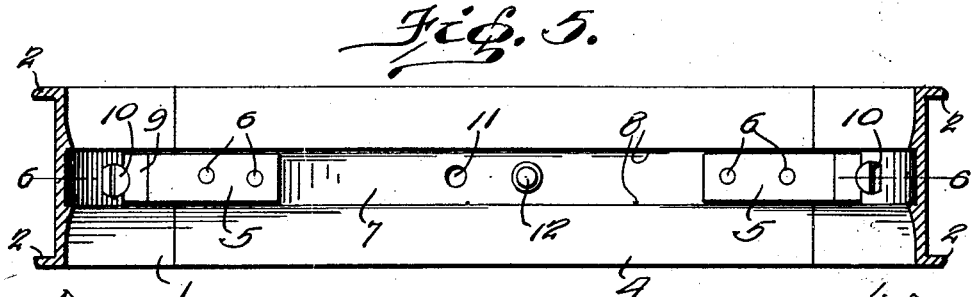
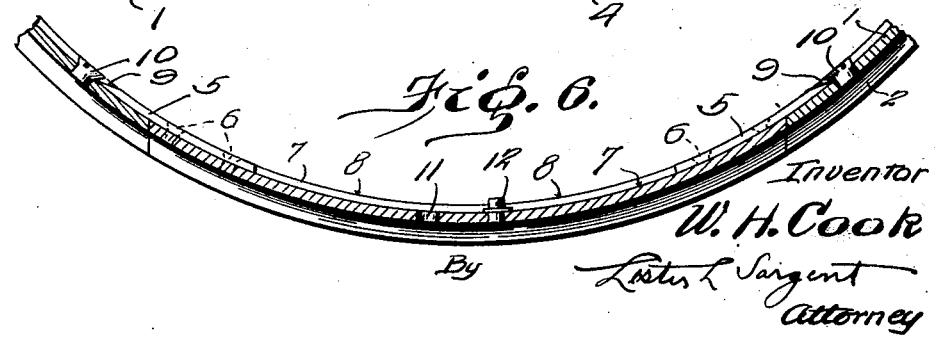

Patented June 30, 1925.

1,544,375

UNITED STATES PATENT OFFICE.

WILLIAM HENRY COOK, OF LEE, MASSACHUSETTS.

EXPANSIBLE RIM.

Application filed September 30, 1921. Serial No. 504,392.

*To all whom it may concern:*

Be it known that I, WILLIAM HENRY COOK, a citizen of the United States, residing at Lee, in the county of Berkshire and State of Massachusetts, have invented a new and useful Expansible Rim, of which the following is a specification.

The object of my invention is to provide a novel expansible rim, having novel means for expanding and contracting same for the removal and replacement of tires; and to provide the novel arrangement and combination of parts hereinafter described and disclosed in the drawings in which—

Fig. 3 is a section approximately on the line 3—3 of Fig. 1;

Fig. 4 is a detail bottom plan view of removable section 4;

Figure 1:
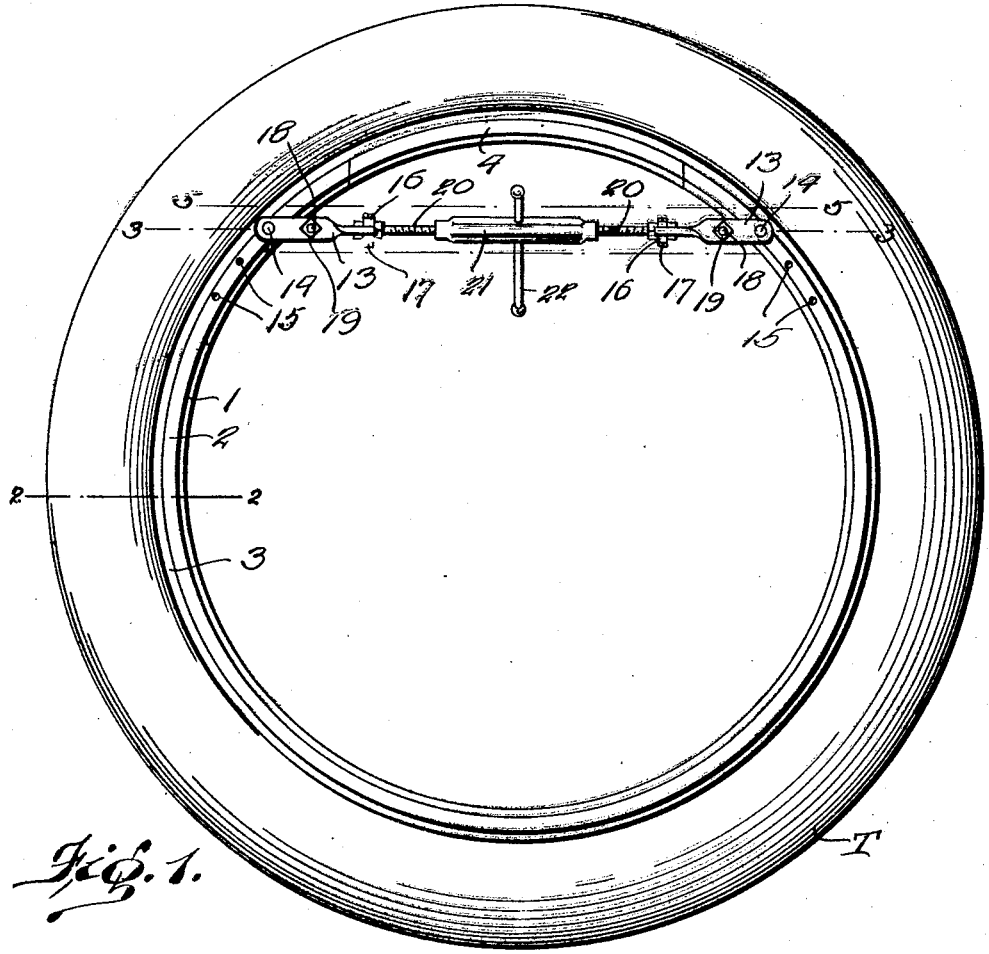
Figure 1 is a side elevation of the rim with the tire applied, showing the expanding device in position for operation.

Fig. 5 is a section on line 5—5 of Fig. 1 showing the removable section 4 in place; and Fig. 6 is a longitudinal section on line 6—6 of Fig. 5.

Like numerals designate like parts in each of the several views.

Figure 2:
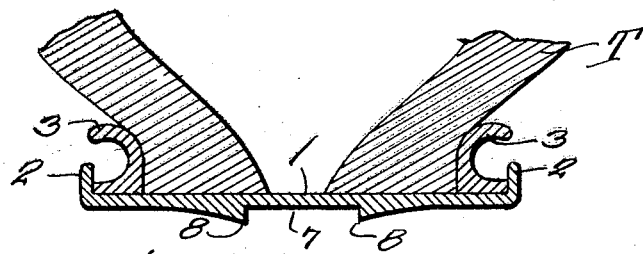
Fig. 2 is a section through the rim on line 2—2 of Fig. 1.

Referring to the drawings illustrating my invention I provide a rim 1 having lateral outwardly turned flanges 2 which function to hold the lateral rings 3 in place as shown in Figs. 2 and 3. Rim 1 is provided with a removable segmental section 4 which has latched tongues at each end affixed to the section in some suitable manner as by rivets 6, said latched tongues being disposed in the circumferential groove 7 which extends around the entire rim, the shoulders of the groove being designated 8. The ends of latched tongues 5 have a beveled portion 9, as shown in Fig. 5, adapted to engage under suitable lugs 10 to secure the removable section 4 in place. I provide a suitable aperture 11 in removable section 4 for receiving the valve stem of the tire. I also provide a suitable conventional centering lug 12.

I provide a device for expanding the rim. This device includes opposite straps 13 having projections 14 engaging opposite recesses in the flanges 2 of the rim. The straps 13 are pivoted at 17 to a spacing strip 16 and are adjustably connected by the adjusting bolt 18 and clamping nut 19. Secured to the spacing straps 16 I further provide tension bolts 20 oppositely threaded and engaging the turnbuckle 21 which is operated by the turning lever 22. The operation of the device will be apparent from the drawings. By turning the lever 22 the turnbuckle 21 retracts or expands the tension bolts 20 which in turn through spacing straps 16 and attaching straps 13 accordingly expand or retract the portion of the rim adjacent the removable section 4. This operation permits of the placing of the removable section 4 with its latched tongues 5 in engagement with the lugs 10 or their removal therefrom as desired. The device is primarily designed and especially adapted for use with heavy truck tires where a heavy rim is required.

What I claim is—

1. In a truck tire rim, the combination of a rim having a removable section, the abutting edges of said rim and said removable section being correspondingly beveled, grooves on the rim, tapered projecting tongues on the removable section, lugs on the rim positioned in proximity to the removable section and distant from the valve stem and engageable by the tapered tongues of the removable section, whereby to secure the removable section in place.

2. In a truck tire rim, the combination of a rim having a centrally positioned annular groove, and having a removable section, centrally disposed projecting tongues on opposite ends of the removable section adapted to seat in the annular groove of the main portion of the rim, lugs on the grooved portion of the rim in proximity to the removable section, the projecting tongues of the removable section being tapered and adapted to engage under the lugs on the main portion of the rim, the removable section not being dependent on the valve stem for locking it in place.

3. In a truck tire rim, the combination of a rim having a removable section, said removable section forming a considerable part of the inside circumference of the contracting and expanding rim, said removable section including the valve stem, the abutting edges of said rim and said removable section being correspondingly beveled, grooves on the rim, tapered projecting tongues on the removable section, lugs on the rim positioned in proximity to the removable section and engageable by the ends of the tapered tongues of the removable section, for the purposes described.

4. In a truck tire rim, the combination of a heavy truck tire rim, said rim having a relatively long removable section, the ends of said section and the abutting ends of the main portion of the tire rim being correspondingly beveled, the removable section having projecting central beveled latch tongues, lugs on the main portion of the tire rim adapted to engage said latch tongues, the removable section not being dependent on the valve stem for fastening the device in operative relation, substantially as and for the purposes described.

WILLIAM HENRY COOK.